United States Patent

Minohara et al.

[11] Patent Number: 5,308,394
[45] Date of Patent: May 3, 1994

[54] PIGMENT AND PROCESS FOR PRODUCING THE SAME

[75] Inventors: Taketoshi Minohara, Toyota; Hiroshi Ito, Ichinomiya; Junichi Handa; Yuji Tanaka, both of Toyota, all of Japan

[73] Assignee: Toyota Jidosha Kabushiki Kaisha, Japan

[21] Appl. No.: 930,463

[22] Filed: Aug. 20, 1992

Related U.S. Application Data

[63] Continuation of Ser. No. 869,846, Apr. 16, 1992, abandoned, and Ser. No. 679,677, Apr. 4, 1991, abandoned.

[30] Foreign Application Priority Data

Apr. 5, 1990 [JP] Japan .................... 2-91223

[51] Int. Cl.⁵ .................... C09C 1/62; C09C 1/36
[52] U.S. Cl. .................... 106/403; 106/417; 106/436; 106/455; 106/479; 106/DIG. 3; 106/437
[58] Field of Search ............ 106/403, 417, 436, 437, 106/455, 479, DIG. 3

[56] References Cited

U.S. PATENT DOCUMENTS

| | | |
|---|---|---|
| 4,038,099 | 7/1977 | DeLuca, Jr. et al. .......... 106/417 |
| 4,954,176 | 9/1990 | Minohara et al. .......... 106/417 |
| 4,976,787 | 12/1990 | Ito et al. .......... 106/417 |

FOREIGN PATENT DOCUMENTS

| | | |
|---|---|---|
| 59-78265 | 5/1984 | Japan . |
| 60-3345 | 1/1985 | Japan . |
| 1-108267 | 4/1989 | Japan . |
| 2-32170 | 2/1990 | Japan . |
| 2-58578 | 2/1990 | Japan . |
| 2011935A | 7/1979 | United Kingdom . |

Primary Examiner—Mark L. Bell
Assistant Examiner—Margaret Einsmann
Attorney, Agent, or Firm—Finnegan, Henderson, Farabow, Garrett & Dunner

[57] ABSTRACT

Disclosed are a pigment including a light-transparent ceramic scaly substrate, a tin compound layer coated on a surface of the substrate in an amount of 0.6 to 0.75% by weight with respect to the substrate, the amount being converted into metallic tin, a rutile type titanium dioxide layer formed on a surface of the substrate coated with the tin compound, a metal compound layer coated on a surface of the titanium dioxide layer in an amount of 0.15 to 0.6% by weight with respect to the substrate, metal of the metal compound being at least one selected from the group consisting of Bi, Sb, As, Cd, Zn, Mn, Pb and Cr, and the amount being converted into metal, and metallic glossy dots formed on the surfaces in a scattering manner, the metallic glossy dots occupying 0.05 to 95% of a total surface area of the surfaces, and a process for producing the same. Since the metallic glossy dots are formed preferentially between the titanium dioxide layer and the substrate on which the tin compound layer facilitating the metallic glossy dots formation selectively is coated. Therefore, the particle diameters of the metallic glossy dots are made uniform, and accordingly the light scattering and the light reflection are also made uniform. As a result, the pigment produces a color tone which varies less. With the production process, it is possible to stably produce a pigment producing a less varying color tone.

15 Claims, 2 Drawing Sheets

PIGMENT AND PROCESS FOR PRODUCING THE SAME

This application is a continuation of application Ser. No. 07/869,846, filed Apr. 16, 1992, now abandoned and 07,679,677, filed Apr. 4, 1991, now abandoned.

BACKGROUND OF THE INVENTION

1. Field of the Invention

The present invention relates to a novel pigment, which produces a color through the light interference as well as the light scattering, and a process for producing the same. In accordance with the present production process, the novel pigment can be produced in a stable color tone.

2. Description of Related Art

A pearl mica pigment has been known so far in which titanium dioxide is coated on a surface of mica. The pearl mica pigment produces a pearl-like color tone through light interference, and it is possible to obtain various interference colors by varying the thickness of the titanium dioxide layer. Further, Japanese Unexamined Patent Publication No. 78265/1984 discloses a pearl mica pigment having an improved weather resistance in which chromium compound is deposited on a surface of a titanium dioxide layer of the pearl mica pigment. Furthermore, Japanese Examined Patent Publication No. 3345/1985 discloses a pigment in which micaceous particles are treated with a solution containing tin compound, the micaceous particles are coated with titanium dioxide, and the micaceous particles are further treated to include chromium hydroxide on the surface.

However, a paint employing the pearl mica pigment does not give a metallic glossy effect, and is not a satisfactory metallic paint. Further, when compared with a metallic paint film containing an aluminum powder, the paint film containing a pearl mica pigment is inferior in the so called "flip-flop characteristic." Here, an inferior "flip-flop characteristic" means that a paint film exhibits small difference between the brightness when viewed at the front and the brightness when viewed diagonally.

Hence, the inventors of the present invention applied for a patent for a novel pigment under Japanese Patent Application No. 265795/1987. The novel pigment comprises a pearl mica pigment or a pearl mica pigment including chromium compound, and a metallic glossy dots including metal (such as silver) or alloy, formed on a surface of the pearl mica pigment or the like in a scattering manner and occupying 0.05 to 95% of the total surface area of the pearl mica pigment or the like. A metallic paint film containing the novel pigment gives a glossy effect resulting from the glossy dots, and produces an interference color resulting from the light interference and a scattering color resulting from the reflection and the scattering. Also, the metallic paint film is superior in the "flip-flop characteristic."

In the course of the development of the novel pigment, the inventors of the present invention found that some of the thus produced novel pigments exhibited varying colors, and that the colors varied considerably when the glossy dots occupied less surface area of the novel pigments in total. The inventors accordingly investigated the cause through an observation with microscope or the like, and discovered the following. When forming the glossy dots in a scattering manner, the distribution and the particle diameters of the glossy dots deviate, and adversely affect the reflection and the scattering of light, thereby varying the interference colors. As a result, the novel pigments exhibit varying colors.

SUMMARY OF THE INVENTION

It is therefore an object of the present invention to provide the novel pigment being capable of producing a stable color tone. It is another object of the present invention to make the distribution and the particle diameters of the glossy dots formed in a scattering manner uniform in order to produce the novel pigment in a stable color tone.

A pigment according to the present invention comprises:

a light-transparent ceramic scaly substrate;

a tin compound layer coated on a surface of the substrate in an amount of 0.6 to 0.75% by weight with respect to the substrate, the amount being converted into metallic tin;

a rutile type titanium dioxide layer formed on a surface of the substrate coated with the tin compound;

a metal compound layer coated on a surface of the titanium dioxide layer in an amount of 0.15 to 0.6% by weight with respect to the substrate, metal of the metal compound being at least one selected from the group consisting of Bi, Sb, As, Cd, Zn, Mn, Pb and Cr, and the amount being converted into metal; and metallic glossy dots formed on the surfaces in a scattering manner, the metallic glossy dots occupying 0.05 to 95% of a total surface area of the surfaces.

A process for producing a pigment according to the present invention solves the above-described problems, the process comprising the steps of:

(1) coating tin compound on a surface of a light-transparent ceramic scaly substrate in an amount of 0.6 to 0.75% by weight with respect to said substrate, said amount being converted into metallic tin;

(2) forming rutile type titanium dioxide layer on a surface of said substrate including said tin compound;

(3) coating compound of metal on a surface of said titanium dioxide layer in an amount of 0.15 to 0.6% by weight with respect to said substrate, said metal being at least one selected from the group consisting of Bi, Sb, As, Cd, Zn, Mn, Pb and Cr, said amount being converted into metal; and (4) forming metallic glossy dots on said surfaces in a scattering manner, said metallic glossy dots occupying 0.05 to 95% of a total surface area of the surfaces.

As for the light-transparent ceramic scaly substrate, mica, molybdenum disulfide or the like can be employed. In view of the cost or the like, the mica is especially recommended. As for the mica, natural mica, such as muscovite, biotite, phlogopite or the like, or synthetic mica can be employed. When the novel pigment is adapted for a paint, it is preferable to employ the light-transparent ceramic scaly substrate having a particle diameter falling in the following ranges: Namely, its thickness falls in a range of 0.05 to 0.1 micrometers and its length falls in a range of 3 to 50 micrometers.

The first step is a step of coating tin compound on a surface of the light-transparent ceramic scaly substrate. It has been known that the tin compound transforms the titanium dioxide layer to be coated in the second step into the rutile type crystals. After the diligent research and development, the inventors discovered that the tin compound also facilitates depositing the metal of the metallic glossy dots to be formed in the fourth step later described, and thought of the present invention.

The tin compound is coated in the amount of 0.6 to 0.75% by weight with respect to the substrate, and the amount is a value converted into metallic tin. When the coating amount is less than 0.6% by weight in a value converted into metallic tin, the rutile type crystals are not held in the titanium dioxide layer securely, they are isolated, or they are turned into the anatase type crystals. Accordingly, the coating amount results in a poor reliability of the titanium dioxide layer. When the coating amount is more than 0.75% by weight in a value converted into metallic tin, the depositing positions of the metallic glossy dots to be deposited in the fourth step later described are made indefinite. In addition, the particle diameters of the glossy dots are increased comparatively, and the metallic glossy dots aggregate and combine to form metallic glossy dots having a particle diameter of 0.1 to 0.2 micrometers. Consequently, the novel pigment sometimes produces a weak bluish tone. However, the probability of the occurrence is uncertain, and the occurrence results in a varying color. Accordingly, the coating amount is unfavorable. The tin compound coating can be carried out by bringing an aqueous slurry of the substrate into contact with a solution of stannous chloride (i.e., tin (II) chloride, $SnCl_2$).

The second step is a step of forming rutile type titanium dioxide layer on a surface of the substrate including the tin compound. For instance, the second step can be carried out by the titanium sulfate method set forth in U.S. Pat. No. 4,038,099. According to the titanium sulfate method, an acidic titanium sulfate solution is added to an aqueous slurry of a substrate treated with tin compound. Then, the mixture is heated to 70° to 110° C. The titanium sulfate is hydrolyzed, and the surface of the substrate is coated with amorphous titanium hydroxide hydrate. After filtering and burning the substrate, the titanium dioxide layer is formed on the surface of the substrate.

The third step is a step of coating a compound of a metal on the surface of the titanium dioxide layer formed in the second step. The metal is at least one selected from the group consisting of Bi, Sb, As, Cd, Zn, Mn, Pb and Cr. The third step can be carried out by hydrolyzing a solution of the chloride or sulfate of the metal as set forth in Japanese Examined Patent Publication No. 3345/1985, thereby depositing the metallic hydroxide. Further, the third step can be carried out by precipitating the metal in the form of its hydroxide, carbonate, phosphate or methacrylate complex as set forth in Japanese Unexamined Patent Publication No. 78265/1984.

In the third step, the metallic compound is coated in the amount of 0.15 to 0.6% by weight with respect to the substrate in a value converted into metal. When the coating amount is less than 0.15% by weight in a value converted into metal, the metallic glossy dots deposition in the fourth step is made very unstable by the optical activity (or reduction action) of the titanium dioxide layer and the metal deposition facilitating action of the tin. Accordingly, the novel pigment thus obtained produces a varying color tone. When the coating amount is more than 0.6% by weight in a value converted into metal, there arises the same trouble resulting from the excessive tin compound coating amount as described above for the first step.

The fourth step is a step of forming metallic glossy dots on the substrate, which have undergone all of the first, second and third steps, in a scattering manner. The metallic glossy dots occupies 0.05 to 95% of the total surface area of the surfaces. As for metal or alloy constituting the metallic glossy dots, the following can be employed: metal such as gold, silver, copper, palladium, cobalt or the like, or alloy such as nickel-phosphorus alloy, nickel-boron alloy, nickel-cobalt-phosphorus alloy, nickel-tungsten-phosphorus alloy, silver-gold alloy, cobalt-silver alloy or the like. The metallic glossy dots can be formed out of a solution containing ions of the metals by the electroless plating method, for instance.

In the fourth step, the metallic glossy dots are formed so that they occupy 0.05 to 95% of the total surface area of the surfaces in total. When the metallic glossy dots occupy less than 0.05% of the total surface area in total, no appreciable effect resulting from the metallic glossy dots formation is available and there is no difference between the effect given by the present novel pigment and the effect given by the conventional pearl mica pigment. When the metallic glossy dots occupy more than 95% of the total surface area in total, all surfaces of the pigment are substantially covered with the metal. Accordingly, the pigment exhibits a poor transparency, loses the pearly glossy effect, and produces a plain color tone.

In addition, when the metallic glossy dots occupy either 0.1% or less or 15% or more of the total surface area of the surfaces in total, a color tone obtained is affected less even when the distribution and the particle diameters of the metallic glossy dots deviate. Accordingly, the color tone varies less. Hence, the present invention is especially effective for the production of the novel pigment which includes the metallic glossy dots occupying 0.1 to 15% of the total surface area in total.

In accordance with the present production process for a pigment, the tin compound is coated on the surface of the light-transparent ceramic scaly substrate in the amount of 0.6 to 0.75% by weight in the first step, and the metallic compound is coated on the surface of the titanium dioxide layer in the amount of 0.15 to 0.60% by weight in the third step. Then, the metallic glossy dots are formed on the substrate in a scattering manner in the fourth step. Here, the tin compound works to facilitate the deposition of the metal constituting the metallic glossy dots. On the other hand, the metallic compound coated in the third step works to suppress the deposition of the metal constituting the metallic glossy dots.

Therefore, in the pigment coated with the tin compound and the metallic compound in the amounts falling in the ranges described above, a tin compound layer 3 is present between a substrate 1 and a titanium dioxide layer 2, and a metallic compound layer 4 is present on the top portion of the titanium dioxide layer 2 as schematically illustrated in FIG. 2. Hence, the inventors assume that a metallic glossy dot 5 deposits preferentially between the titanium dioxide layer 2 and the substrate 1 on which the tin compound layer 3 having the function of selectively facilitating the metal deposition is present. Thus, the particle diameters of the metallic glossy dots are made uniform, and accordingly the light scattering and the light reflection are also made uniform. As a result, the pigment is inhibited from producing the varying color tone.

On the other hand, when the tin compound and the metallic compound are coated in large amounts, the tin compound layer 3 working to facilitate the deposition of the metal constituting the metallic glossy dots and the metallic compound layer 4 working to supress the deposition of the metal constituting the metallic glossy dots are likely to coexist as schematically illustrated in FIG. 3. In this case, the metallic glossy dots 5 accordingly is likely to deposit on the top portions and the bottom portions of the titanium dioxide layer 2. Thus, the inventors assume as follows: The metallic glossy dots 5 deposits on various depositing positions indefinitely, the metallic glossy dots 5 deposit in a localized manner and aggregate, and accordingly the particle diameters of the metallic glossy dots 5 vary.

Therefore, in accordance with the production process for a pigment according to the present invention, it is possible to stably produce a pigment producing a less varying color tone.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
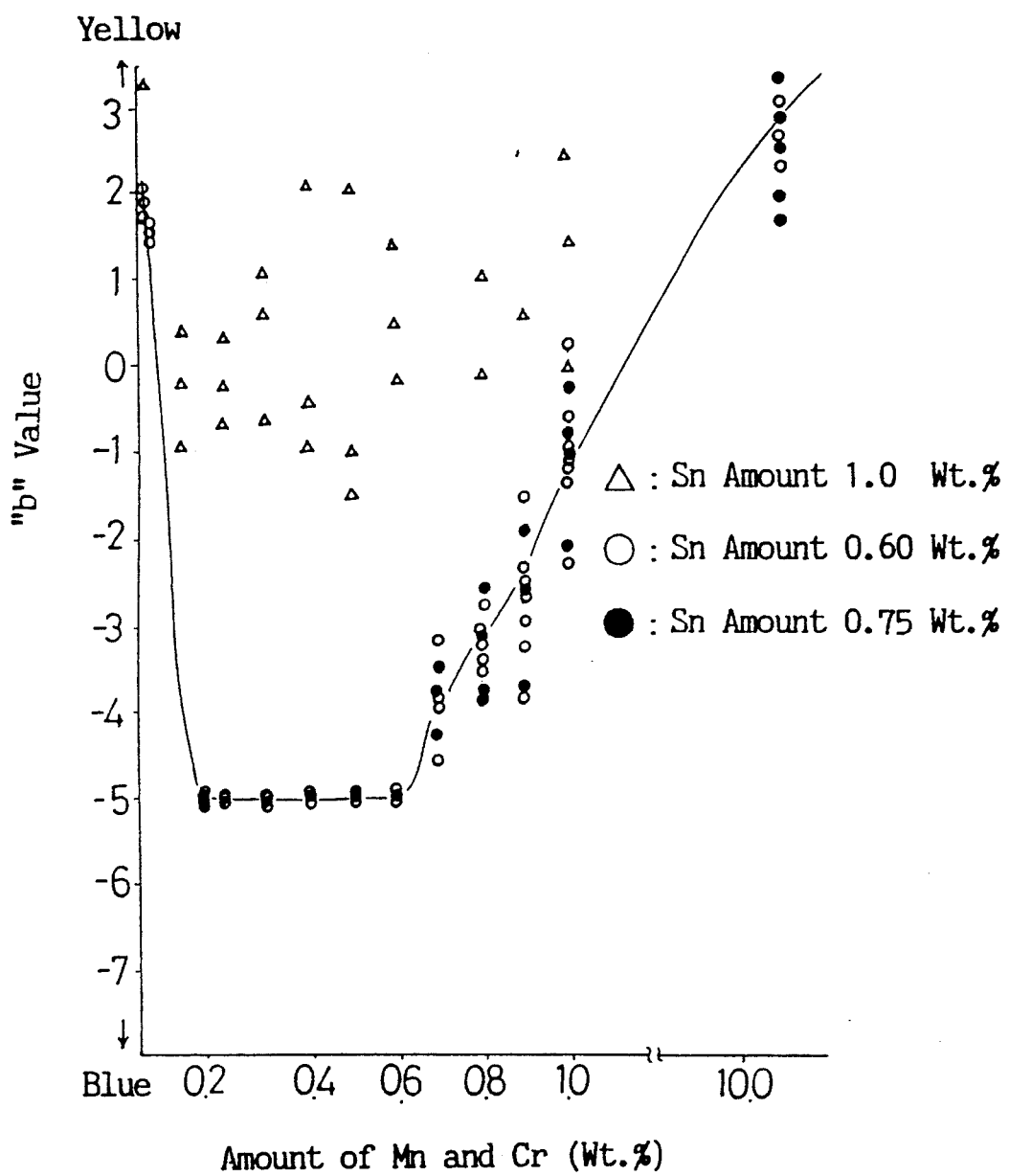
FIG. 1 is a scatter diagram illustrating how manganese coating amounts and chromium coating amounts affect the "b" values of novel pigments adapted for paint films.
Figure 2:
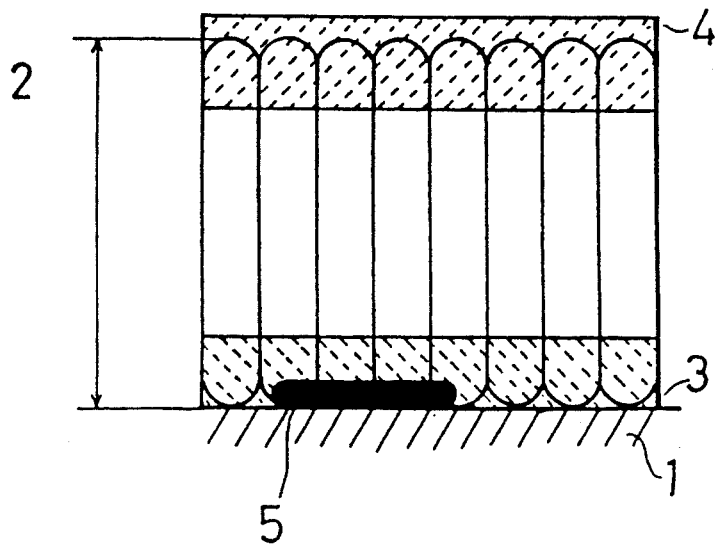
FIG. 2 is a schematic cross sectional view of a pigment produced by a production process according to the present invention.
Figure 3:
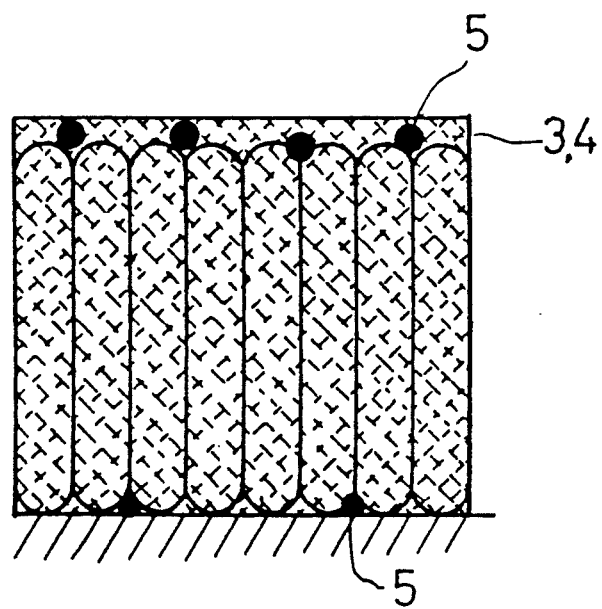
FIG. 3 is a schematic cross sectional view of a pigment produced by a production process in which a tin compound layer and a metallic compound layer are coated in coating amounts deviating from those of the present invention.

Having generally described the present invention, a further understanding can be obtained by reference to the specific preferred embodiments which are provided herein for purposes of illustration only and are not intended to limit the scope of the appended claims.

First Step

An aqueous solution of stannous chloride (i.e., tin (II) chloride, $SnCl_2$) containing hydrochloric acid was prepared. Mica was suppoied into the aqueous solution so as to make a slurry. The slurry was heated to and held at a temperature of 55° C., washed, filtered and dried in order to obtain mica coated with tin compound. The coating method is described in U.S. Pat. No. 4,038,099 in detail. The first step was carried out in accordance with the description set forth in U.S. Pat. No. 4,038,099. The mica was coated with the tin compound in the following 3 kinds of the tin compound coating amounts: 0.6% by weight, 0.75% by weight and 1.0% by weight with respect to the mica (i.e., a substrate). The tin compound coating amounts were the values converted into metallic tin.

Second Step

The 3 micas coated with the tin compound were made into 3 pearl mica pigments by forming the rutile type titanium dioxide layer thereon in accordance with the titanium sulfate method set forth in U.S. Pat. No. 4,038,099.

Third Step

Each of the 3 pearl mica pigments was suspended in 1 liter of water in an amount of 100 grams. Then, 100 milliliters of a first aqueous solution containing 0.92 grams of $MnSO_4.2H_2O$ and 17 grams of $KCr(SO_4)_2.12H_2O$ and 100 milliliters of a second aqueous solution containing 15 grams of $NaH_2PO_4.2H_2O$ were added to each of the suspensions over a period of 1 hour while maintaining the PH value and the temperature of the suspensions at 4.5 and 50° C. respectively. During the addition of the first and second aqueous solutions, the PH value was maintained at the predetermined value by adding a 2% sodium hydroxide aqueous solution simultaneously. Thereafter, the PH value of the suspensions was raised to 5.0. The suspensions were stirred for another 1 hour, filtered, washed with water, and dried at 50° C. so as to obtain pearl mica pigments treated with chromium compound and manganese compound. Further, the addition amounts of the $KCr(SO_4)_2.12H_2O$ and/or the $NaH_2PO_4.2H_2O$ were varied in order to distribute the coating amounts of the chromium compound and the manganese compound in a range of 0.01 to 10% by weight with respect to the entire mica (i.e., a substrate). The deposition amounts were the values converted into metallic chromium and metallic manganese.

Fourth Step

Then, each of the pearl mica pigments treated with the chromium compound and the manganese compound were suspended in 900 milliliters of water in an amount of 30 grams. Thereafter, 60 milliliters of a silver solution prepared in advance and containing 50 grams/liter of $AgNO_3$ and 50 milliliters of a 28% ammonium aqueous solution was added to the suspensions. Further, 10 milliliters of formalin (i.e., a 35% formaldehyde aqueous solution) was added to the suspensions as a reducing agent, and the suspensions were stirred for 60 minutes. Afterwards, the suspensions were washed and filtered with a sufficient amount of water 3 times, and then dried in order to form metallic glossy dots comprising silver. The metallic glossy dots occupied 1.5% of the total surface area of the pearl mica pigments treated with the chromium compound and the manganese compound.

Evaluation

The novel pigments obtained as described above and including the tin compound, the chromium compound and the manganese compound in various coating amounts were dispersed in an automobile clear paint respectively. After painting the clear paints in a film thickness of 500 micrometers, the color tones of the paint films were measured in order to obtain the Hunter's "Lab" values. According to the measurement, no appreciable differences were observed in the "L" values and the "a" values. However, a remarkable fluctuation was observed in the "b" values. FIG. 1 illustrates the fluctuations in the "b" values exhibited by the paint films as a scatter diagram.

As can be seen from FIG. 1, when the novel pigments include the tin compound in the coating amount of 0.6 to 0.75% by weight converted into metallic tin and the chromium compound and the manganese compound in the total coating amount of 0.15 to 0.6% by weight converted into a total amount of metallic chromium and metallic manganese, the novel pigments have stable "b" values particularly.

Having now fully described the present invention, it will be apparent to one of ordinary skill in the art that many changes and modifications can be made thereto without departing from the spirit or scope of the present invention as set forth herein including the appended claims.

What is claimed is:

1. A pigment comprising:
   a light-transparent ceramic scaly substrate;
   a tin compound layer coated on a surface of said substrate in an amount of 0.6 to 0.75% by weight with respect to said substrate, said amount being converted into metallic tin;
   a rutile type titanium dioxide layer formed on a surface of said substrate coated with said tin compound;
   a metal compound layer coated on a surface of said titanium dioxide layer in an amount of 0.15 to 0.6% by weight with respect to said substrate, the metal of said metal compound being at least one selected from the group consisting of Bi, Sb, As, Cd, Zn, Mn, Pb and Cr, and said amount being converted into metal; and
   metallic glossy dots formed on said substrate in a scattering manner, said metallic glossy dots occupying 0.05 to 95% of a total surface area of said surfaces,
   wherein said metal dots are of uniform particle diameters and are formed between said titanium dioxide layer and said substrate.

2. The pigment according to claim 1, wherein said substrate is at least one selected from the group consisting of mica and molybdenum disulfide.

3. The pigment according to claim 2, wherein said mica is at least one selected from the group consisting of natural mica and synthetic mica.

4. The pigment according to claim 3, wherein said natural mica is at least one selected from the group consisting of muscovite, biotite and phlogopite.

5. The pigment according to claim 1, wherein said substrate has a thickness of 0.05 to 0.1 micrometers and a length of 3 to 50 micrometers.

6. The pigment according to claim 1, wherein said metallic glossy dots includes at least one metal selected from the group consisting of gold, silver, copper, palladium, cobalt, nickel-phosphorus alloy, nickel-boron alloy, nickel-cobalt-phosphorus alloy, nickel-tungsten-phosphorous alloy, silver-gold alloy, and cobalt-silver alloy.

7. The pigment according to claim 1, wherein said metallic glossy dots occupy 0.1 to 15% of the total surface area of said surfaces.

8. A process for producing a pigment comprising the steps of:
   (1) coating tin compound on a surface of a light-transparent ceramic scaly substrate in an amount of 0.6 to 0.75% by weight with respect to said substrate, said amount being converted into metallic tin;
   (2) forming rutile type titanium dioxide layer on a surface of said substrate including said tin compound;
   (3) coating compound of metal on a surface of said titanium dioxide layer in an amount of 0.15 to 0.6% by weight with respect to said substrate, said metal being at least one selected from the group consisting of Bi, Sb, As, Cd, Zn, Mn, Pb and Cr, and said amount being converted into metal; and
   (4) forming metallic glossy dots on said substrate in a scattering manner, said metallic glossy dots occupying 0.05 to 95% of the total surface area of said surfaces, wherein said metal dots are of uniform particle diameters and are formed between said titanium dioxide layer and said substrate.

9. The process for producing a pigment according to claim 8, wherein said substrate is at least one selected from the group consisting of mica and molybdenum disulfide.

10. The process for producing a pigment according to claim 9, wherein said mica is at least one selected from the group consisting of natural mica and synthetic mica.

11. The process for producing a pigment according to claim 10, wherein said natural mica is at least one selected from the group consisting of muscovite, biotite and phlogopite.

12. The process for producing a pigment according to claim 8, wherein said substrate has a thickness of 0.05 to 0.1 micrometers and a length of 3 to 50 micrometers.

13. The process for producing a pigment according to claim 8, wherein said metallic glossy dots includes at least one metal selected from the group consisting of gold, silver, copper, palladium, cobalt, nickel-phosphorus alloy, nickel-boron alloy, nickel-cobalt-phosphorus alloy, nickel-tungsten-phosphorous alloy, and silver-gold alloy, cobalt-silver alloy.

14. The process for producing a pigment according to claim 8, wherein said metallic glossy dots occupy 0.1 to 15% of the total surface area of said surfaces.

15. A pigment produced by the process according to claim 8.

* * * * *